March 11, 1958 L. PÉRAS 2,826,674
WELDING METHODS AND APPARATUS
Filed Jan. 10, 1955 3 Sheets-Sheet 1

United States Patent Office 2,826,674
Patented Mar. 11, 1958

2,826,674

WELDING METHODS AND APPARATUS

Lucien Péras, Billancourt, France, assignor to Regie Nationale des Usines Renault, Billancourt, France, French works under the control and the authority of the French Government Application January 10, 1955, Serial No. 480,947

Claims priority, application France February 10, 1954

9 Claims. (Cl. 219—91)

This invention relates to a method of welding metals, notably for sheet metal elements of automobile bodies. It is also concerned with an electronic apparatus for controlling a welding machine in accordance with the aforesaid method.

In the automotive industry, sheet steel parts are generally assembled by using electrical spot welding machines. Considering for example the problem of welding sheet steel parts of a thickness ranging from 0.028" to 0.060" with a carbon content not greater than 0.15%, due to the relatively high plasticity of the metal the control cycle of the welding machine is rather simple and comprises the following steps:

(a) The sheet parts are pressed together along their overlapping edges between the welding electrodes;
(b) Welding current is supplied to the machine;
(c) The pressure is maintained after stopping the current;
(d) Another cycle is performed if a "flying" mass production procedure is adhered to.

On the other hand, if thicker steel sheets or plates, for example beyond 0.060", are to be assembled, the known asynchronous electronic apparatus are designed to accomplish the following steps in the proper time sequence and periods:

(1) Clamping the steel sheets to be assembled;
(2) Full welding current passage time interval;
(3) Actual welding current passage period;
(4) Non-conductive period;
(5) Electrode pressure holding period subsequent to discontinuing the supply of welding current;
(6) Repeating the cycle.

This procedure is characterized in that the periods (3), or actual welding current passage period, and (4), or non-conductive period, are repeated several times within a single period (2), or full interval. Besides, the welding electrodes are constantly contacting the parts to be joined during the full current passage period.

Therefore, conductive and non-conductive elementary periods are included in the time corresponding to the full current passage interval. These elementary periods are called "pulsations" and the welding procedure itself is termed "pulsation welding."

An electronic apparatus for controlling a machine, notably a welding machine, which is designed to repeat on the one hand equal current-conducting time periods and, on the other hand, equal non-conductive time periods, is described and illustrated in the French patent application filed on March 28, 1953, now Patent No. 1,099,933, by the Regie Nationale des Usines Renault, for "Electronic Sequence Non-Synchrone Apparatus For Machines Performing a Plurality of Recurrent Complex Cycles." This apparatus provides the intermediate contacts of the cycle by means of thyratron tubes arranged in separate stages comprising circuit sections, so that the coils of electromagnet valves and relays to be controlled are inserted in the anode circuits of the thyratrons, the latter supplying capacitors adapted to block and release the tubes of the other stages by acting on the grid potentials of these tubes. It is also well known to replace the control relay for the ignitron tubes by two power thyratron tubes (of type PL105 or other type) with a tuned circuit operating from the starting point of the sinusoïd. A dephasing circuit, so called "heat-control," is generally added to the tuned circuit. This apparatus is called "synchronous control." In this case, certain circuit sections are arranged to form closed circuits in which a given portion of the cycle, for instance the control of the conductive and non-conductive periods, is repeated until the action produced by another partial circuit will discontinue the steps of the cycle portion taking place by blocking one or more tubes.

As a result, all the conductive periods are equal to one another and the non-conductive periods are also equal to one another, the respective cycle values being of course adjustable at will once for all for repeating a predetermined welding operation.

Pulsation welding is advantageous in that is provides a progressive heating of the sheet parts to be welded until the welding spot is obtained, the first current impulses effecting a preheating and the last current impulses the welding proper.

However, the welding operations performed with this apparatus may offer a few drawbacks, due notably to the fact that the non-conductive periods are equal from the beginning to the end of the complete current passage interval, so that the non-conductive periods, according to their positions in the cycle, are either too short or too long. When too short non-conductive period occurs, the resulting work is comparable to that obtained from the welding procedure without pulsations which includes only the four steps (a) to (d) described hereinabove. The parts are overheated and molten metal droplet projections may take place, thereby developing internal stress or shrinkage cavities.

When on the contrary the non-conductive periods are too long, the heat applied during the conductive period is partly lost by conduction in the sheet metal and by radiation in the surrounding atmosphere during the non-conductive periods. The mechanical strength of the spot welds is doubtful and moreover an excessive overheating of the parts to be assembled is observed.

Now it is the essential object of this invention to provide a pulsation welding method corresponding to a cycle of operations wherein the total time interval during which the current is applied to the work comprises a plurality of elementary conductive time periods, or "heat times," and non-conductive time periods or "cool times" of variable and progressively decreasing durations, according to a predetermined sequence depending on the welding operation to be effected. The first current pulses are separated by the longer cold periods and effect a preheating of the joint, and the last current pulses—which are the actual welding pulses—occur between cold periods of progressively decreasing duration. Thus, the strength of the welded spot is improved and the electrode life increased.

The machine for pulsation welding with decreasing cold periods is controlled from an electronic apparatus having an asynchronous or synchronous sequence characteristic in accordance with the teachings of this invention and adapted to perform repeated and complex cycles comprising time periods of same character but unequal durations. This apparatus comprises essentially a number of thyratron circuit sections of which some control the energizing windings of electromagnet valves and relays of the machine, other circuit sections being arranged to become alternately conductive and non-conductive in cascade so as to produce the pulsations, i. e., in the specific application of the apparatus to a welding machine, the heat and cool times occurring within the total current passage interval. The unequal time periods, for example the progressively decreasing cold time periods, are determined by means of a vacuum electron tube (for example a triode, tetrode or pentode) incorporated into the anode circuit of one of the thyratron tubes and adapted, through the variation of its internal resistance, to modify from one pulsation to another of same character the discharge time of a capacitor controlling the value of the "cold" period.

An electronic apparatus according to this invention for controlling a welding machine of the pulsation welding type will be described hereafter with reference to the accompanying drawings forming part of this specification and showing diagrammatically, by way of example, the manner in which the invention may be carried out in the practice. The apparatus is not covered by this application, a divisional application Serial No. 569,795 having been filed on March 6, 1956, as to it.

Figure 1:
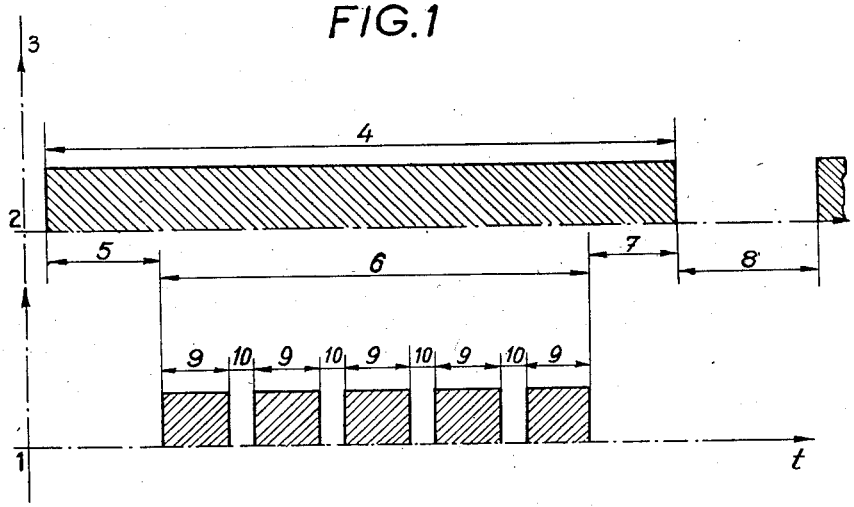
Figure 1 is a diagram showing the principle on which the known method of pulsation welding is based.

In the diagram of Fig. 1, the time is plotted in abscissae against the welding voltage in ordinates between the points 1 and 2, the pressure of the electromagnet valve of the welding machine being shown between points 2 and 3. The time 4 is that during which the electrodes are pressed against the work, 5 is the joint-forming period, 6, the total welding interval, 7 the excess time or hold time during which the electrodes are maintained under pressure after the welding current has been stopped, and 8 the "repeating" time elapsing between two successive welding spots. Finally, the actual current conducting period occurs during the times 9, the intermediate times 10 being the non-conductive ones.

Figure 2:
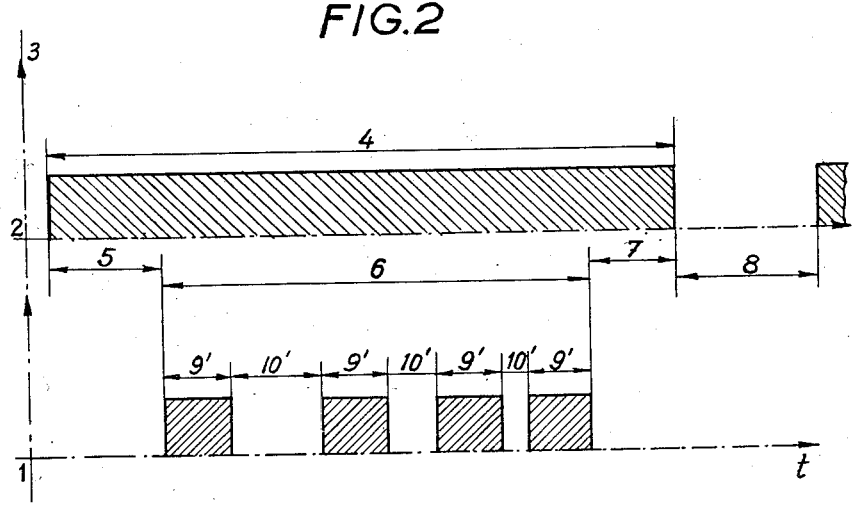
Figure 2 is another diagram showing the principle of the pulsation welding method with decreasing cold periods according to the teachings of this invention.

In the diagram of Fig. 2 showing the method of welding sheet parts according to the teachings of this invention, the points 1 to 3 and the time periods 4 to 8 correspond to those of Fig. 1. The actual current conductive periods are designated at 9' and the non-conductive periods at 10'. In this respect, it may be pointed out that the diagram of Fig. 2 shows but one example of a welding cycle which is given for illustrative purposes only and should not be construed as limiting the scope of the invention as the latter is not confined to the number of operations in a cycle, to the durations and number of pulsations indicated herein.

Figure 3A:
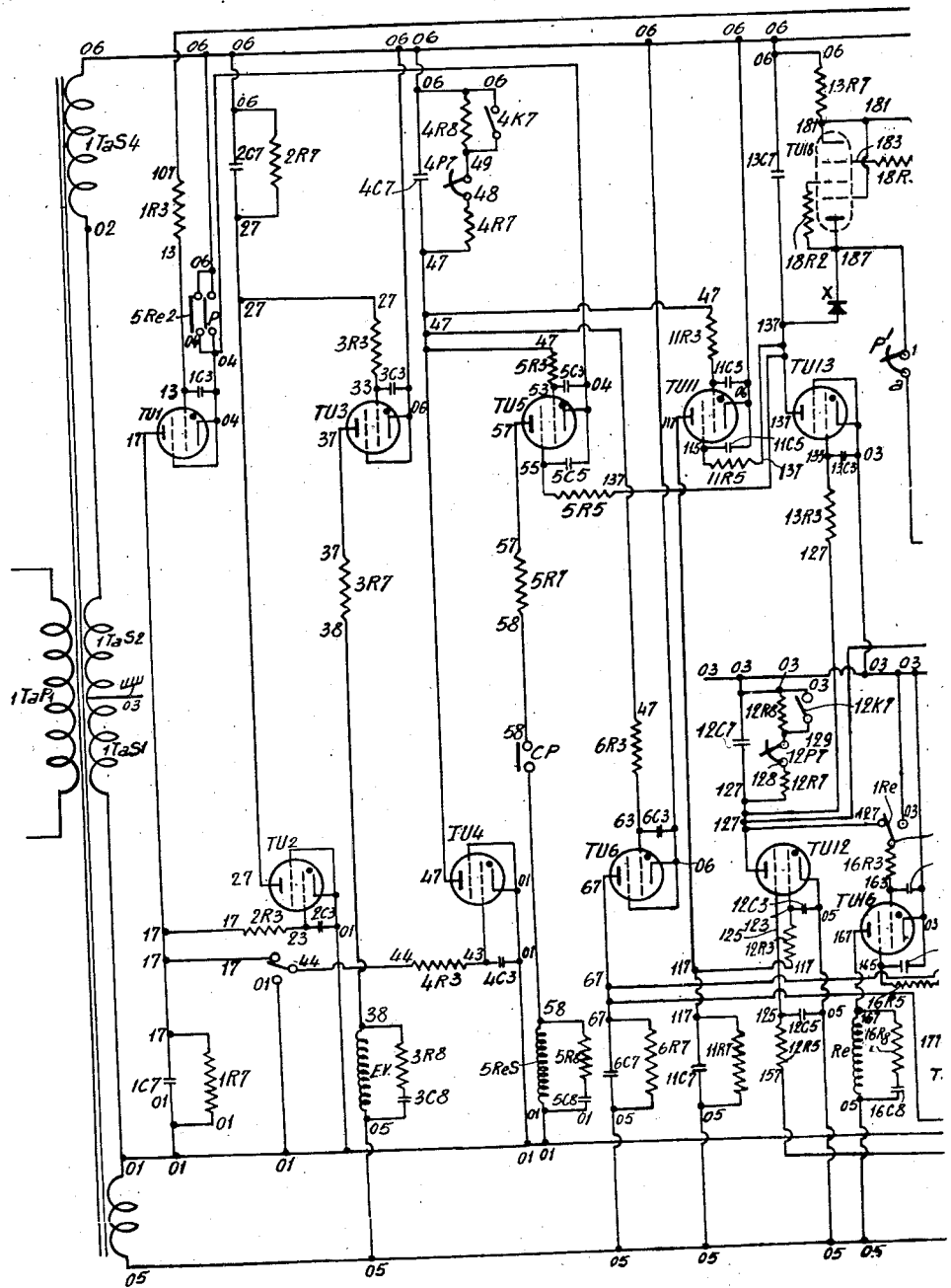
Figure 3 comprising parts A and B is a wiring diagram of the electronic control apparatus for carrying out the invention.
Figure 3B:
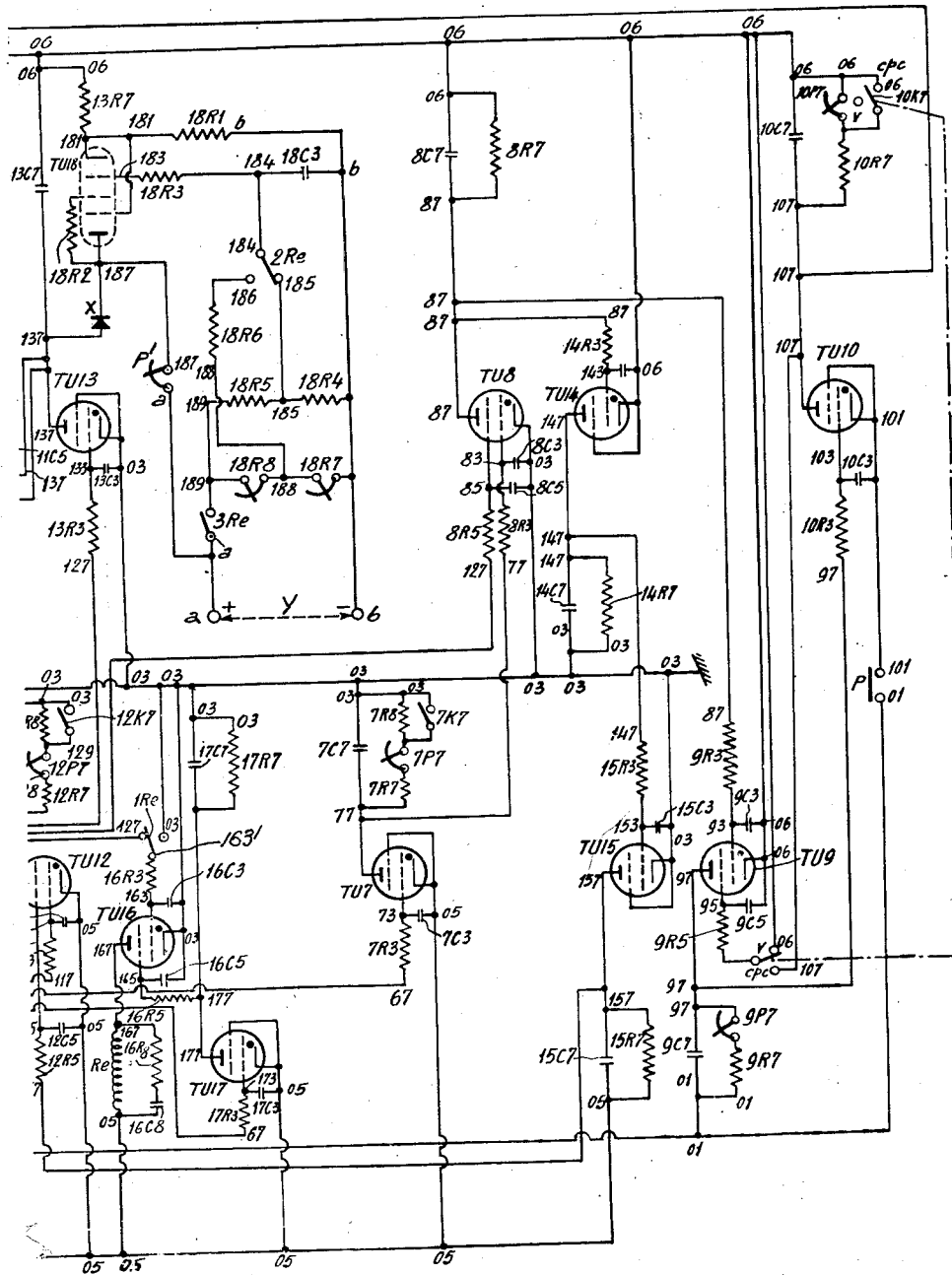

The wiring diagram of the apparatus provided by this invention is shown in Fig. 3 of the drawings. The complete circuit is supplied with single-phase A. C. voltage from a transformer having four secondaries 1TaS1 to 1TaS4 each capable of 55 efficient volts or 55 R. M. S. volts; this circuit comprises 17 electronic tubes of the thyratron type designated by the reference symbols TU1 to TU17, and a vacuum tube TU18. The circuit section of each tube comprises essentially a capacitor and a resistor in the anode circuit, a resistor in the grid circuit, and, accessorily, decoupling capacitors, potentiometers and reversing switches.

In order to afford a clearer understanding of the principle according to which the apparatus operates, two circuit sections corresponding to the tubes TU1 and TU18 respectively will be described hereafter.

The circuit of the thyratron tube TU1 is fed with single-phase A. C. between the points O1 and O6. Its cathode circuit comprises a switch P between points O6 and O4 which is controlled by means of the treadle actuated by the operator of the machine, the treadle when depressed closing a holding contact 5Re2. A resistor 1R3 is inserted in the control grid circuit and a decoupling capacitor 1C3 is positioned between the cathode circuit and the grid circuit. The anode circuit of tube TU1 comprises a capacitor 1C7 disposed between the points O1 (transformer terminal) and 17 (anode), and a resistor 1R7 is connected across the capacitor terminals.

In the specific case of this tube, a pair of grid circuits extend from point 17, the one through the resistor 2R3 to the control grid of tube TU2 to permit, by suitably biasing this grid, to block and release the tube TU2, and the other through the reversing switch 17—44 and resistor 4R3 to the terminal 43 of the control grid of tube TU4 so that the latter may be blocked and released through the action of the circuit of tube TU1. On the other hand, when the reversing switch connects points O1 and 44, the operation sequence is discontinued as the electrodes are maintained under pressure but without passing any welding current therethrough.

The vacuum tube TU18 is disposed in the anode circuit of the thyratron tube TU13 so that its anode will be connected to the anode of tube TU13 through a current rectifier $x$ and to the positive terminal of a D. C. source $y$ through a selection potentiometer P1.

The cathode of the vacuum tube is connected on the one hand to the terminal O6 of the secondary winding 1TaS4 of the general supply transformer through a resistor 13R7 and, on the other hand, to the negative terminal of the D. C. source $y$ through a resistor 18R1.

The circuit of the control grid of the vacuum tube TU18 comprises notably a capacitor 18C3 and a resistor 18R3, the terminal 184 therebetween corresponding to the terminal of a reversing switch 2Re controlled from a relay Re disposed in the anode circuit of tube TU16. The terminals 185 and 186 of the reversing contact represent the one the intermediate point of a D. C. voltage divider constituted by resistors 18R4 and 18R5, and the other the intermediate point of a D. C. voltage divider comprising the adjustable resistors 18R7 and 18R8.

The discharge of capacitor 13C7 determining the non-conductive time period of the welding current by blocking the thyratron tube TU5 in the anode circuit comprising the welding relay 5ReS, the variation in the successive discharge times of capacitor 13C7 makes it possible to vary the successive "cold" times. The automatic variation in the discharge time of the capacitor is ensured through the variation in the internal resistance of the vacuum tube TU18 by the discharge of capacitor 18C3 through resistor 18R7. As the grid voltage of the vacuum tube TU18 varies more or less rapidly, the plate output and the anode voltage of the tube are thus influenced and the internal resistance of the tube is altered accordingly.

When the contact P between points O6 and O4 is open, the actions produced by the different circuit elements of this assembly are as follows:

Tube TU1 is not conducting as the contact between points O6 and O4 is open.

Tube TU2 is conducting as its control grid receives the same potential as its cathode, so that it charges the capacitor 2C7 across the resistor 2R7.

Tube TU3 is non-conducting because, due to the conduction established in circuit TU2, its control grid has a negative potential relative to the cathode potential. Therefore, the electromagnet valve coil EV is still non-energized.

Tube TU4 is conducting like tube TU2 as its control grid and cathode are at the same potential. Consequently, this tube charges the capacitor 4C7 across the circuit comprising resistor 4R7, potentiometer 4P7, resistor 4R3 or switch 4K7.

Tube TU5 is non-conducting as its anode circuit is open between the points O6 and O4 due to the opening of the treadle-actuated contact P. On the other hand, its control grid has a negative potential relative to the cathode potential due to the conduction of current through the circuit TU4. It will be noted that the screen grid is at the same potential as the cathode since it is connected to the anode circuit of tube TU13 and this tube is non-conducting, as will be seen presently.

Tube TU6 is non-conducting because its control grid is connected to the anode circuit TU4 and its potential is therefore negative with respect to the cathode potential due to the conducting state of tube TU4.

Tube TU11 is non-conducting because, as in the case of tube TU5, its control grid is connected to the anode circuit of TU4 and negative relative to the cathode due to the conducting state of circuit TU4. Moreover, it will be noted that the screen-grid of this tube TU11 has the same potential as its cathode since the tube TU13—to whose anode circuit it is connected—is non-conducting.

Tube TU12 is conducting because tube TU11 is non-conducting and its control grid, connected to the anode circuit of TU11, has the same potential as its cathode. The screen-grid is also fed with the same potential for, being connected to the anode circuit of the non-conducting tube TU15, it has the potential of point O5. Capacitor 12C7 is thus charged through resistor 12R7, potentiometer 12P7, resistor 12R8 or switch 12K7.

Tube TU13 is non-conducting due to the fact that its control grid is at a negative potential relative to its cathode due to the conducting state of circuit TU12.

Tube TU16 is non-conducting as its grid has a negative potential relative to its cathode since tube TU12 is conducting, the reversing switch 1Re being positioned as shown in the figure. The screen-grid of tube TU16 is blocked due to the conducting state of tube TU17.

Tube TU17 is conducting because it is at the same potential as its cathode so that it charges the capacitor 17C7 across resistor 17R7.

The vacuum tube TU18 is energized and its internal resistance is relatively high.

Tube TU7 is conducting due to the non-conducting state of tube TU6, its control grid and cathode being at the same potential, i. e. that of point O5. Consequently, the tube charges the capacitor 7C7 through resistor 7R7, potentiometer 7P7, resistor 7R8 or switch 7K7.

Tube TU8 is not conducting since its grid has a negative potential relative to the cathode, because the circuit of tube TU7 is conducting.

Tube TU14 is conducting because tube TU8 is non-conducting. Capacitor 14C7 is thus charged through resistor 14R7.

Tube TU15 is non-conducting because tube TU14 is conducting.

Tube TU9 however is conducting and charges the capacitor 9C7 connected thereto through potentiometer 9P7 and resistor 9R7. It will be noted that the screen-grid of this tube is constantly at the same potential as the cathode when the reversing switch V is positioned as indicated in the figure to connect points 96 and O6, this position corresponding to the "flying" or mass-production operation conditions. If switch V were positioned to connect points 95 and 107, the screen-grid of TU9 would also be at the same potential as the cathode, tube TU10 being non-conducting.

Tube TU10 is non-conducting because contact O1—101 operatively connected to contact O4—O6 is open.

When the operator of the welding machine has depressed the treadle P the closing of the contact between points O6 and O4 causes the cycle of operations of the machine to be initiated. The actions of the various elements constituting the circuit is then as follows:

Tube TU1 is now conducting as its control grid is at the same potential (that of point O6) as its cathode. Capacitor 1C7 is thus charged through resistor 1R7 and blocks tubes TU2 and TU4 through its action on their control grids now at a negative potential relative to their cathodes. Due to this non-conducting state, capacitors 2C7 and 4C7 are discharged.

Capacitor 2C7 is discharged through resistor 2R7. When it has zero potential the control grid of tube TU3 is at the same potential as the cathode of this tube. Then tube TU3 becomes conducting and energizes the electromagnet valve coil EV, thus controlling the approaching movement of the welding electrodes. This is the beginning of the jointing or electrode-approaching operation or squeeze time.

The capacitor 4C7 is discharged through resistor 4R7, potentiometer 4P7, resistor 4R8 or switch 4K7. The potentiometric adjustment makes it possible to retard and determine exactly the discharge time of capacitor 4C7 and, therefore, the time elapsing between the beginning of the jointing step and the beginning of the welding start. When the capacitor has zero potential, theorically tubes TU5, TU6 and TU11 are simultaneously conducting. In fact, the control grids of these three tubes, which are connected to the point 47 of the anode circuit of tube TU4, are now at the same potential as their cathodes, i. e. the potential of point O6. The screen-grids of tubes TU5 and TU11 are also at the same potential as their cathodes, as tube TU13 is non-conducting.

Tube TU5 now conducting will energize the welding relay 5ReS, switch CP being closed. Welding current is thus supplied to the electrodes.

Tube TU6 is conducting and commences to charge capacitor 6C7 through resistor 6R7, and simultaneously blocks the control grids of tubes TU7 and TU17, these grids passing to a negative potential relative to their cathodes due to the conducting state, in this circuit, of tube TU6. The blocking of tube TU7 permits the discharge of capacitor 7C7 through resistor 7R7, potentiometer 7P7, resistor 7R8 or switch 7K7. This is the beginning of the counting of the "welding interval" time. Regarding the tube TU17, its non-conducting state entails the discharge of capacitor 17C7 through resistor 17R7.

The conducting tube TU11 will initiate the charging of capacitor 11C7 through resistor 11R7, thereby blocking the control grid of tube TU12 so that the latter will no more be conducting, and the capacitor 12C7 will thus be able to discharge itself through resistor 12R7, potentiometer 12P7, resistor 12R8 or switch 12K7. This is the beginning of the counting of the first "heat time."

Capacitor 17C7 in the meantime has been discharged to zero potential and tube TU16 becomes conductive, its screen-grid having the same potential as its cathode. As the winding of relay Re is energized, its contacts 1Re, 2Re and 3Re are reversed so as to connect the points 163' and O3, 184 and 186, 189 and the positive terminal $a^+$ of the source of current $y$, respectively. The control grid of tube TU16 is thus kept to the potential of its cathode although the capacitor 12C7 is discharged and tube TU16 will remain conductive until its screen-grid attains a negative potential relative to its cathode. At the same time, the reversing of contact 2Re enables the capacitor 18C3 to discharge itself through the variable resistor 18R7.

When the capacitor 12C7 attains the potential 0, the tube TU13 becomes conductive and charges the capacitor 13C7 through resistor 13R7 and vacuum tube TU18, the resistance of this last-mentioned tube decreasing as the grid bias varies. The screen-grids of tubes TU5 and TU11 are thus blocked and these tubes become non-conductive. As a consequence, regarding the tube TU5, the welding relay 5ReS is de-energized. This is the end of the first "heat time." However, the control grid of this tube remains at the potential of its cathode as long as the tube TU4 is non-conducting. Regarding the non-conducting state of tube TU11, its consequence is to enable the capacitor 11C7 to be discharged through resistor 11R7.

When capacitor 11C7 attains its zero potential condition, tube TU12 becomes conductive, charges the capacitor 12C7 through resistor 12R7, potentiometer 12P7, resistor 12R8 or switch 12K7, so that tubes TU13 and TU8 are rendered non-conductive due to the blocking of the control grid of the former and to the blocking of the screen-grid of the latter.

The non-conductive state of tube TU13 causes the capacitor 13C7 to be discharged through resistor 13R7 and vacuum tube TU18. This is the beginning of the counting of the first "cool time." The duration of this cold period is conditioned by that of the discharge of capacitor 13C7 which in turn is a function of the internal resistance R1 of the vacuum tube TU18, this resistance depending itself on the grid potential K of this tube TU18.

When capacitor 13C7 is brought to zero potential, tube TU5 becomes again conductive and supplies energizing current to the welding relay 5ReS. This marks the end of the counting of the first "cool time." The tube TU11 is also brought to its conducting state, capacitor 11C7 is charged through resistor 11R7, and tube TU12 is again non-conducting, so that capacitor 12C7 may be discharged through resistor 12R7, potentiometer 12P7, resistor 12R8 or switch 12K7. This is the beginning of the counting of the second "heat time."

When capacitor 12C7 is discharged, tube TU13 is again conducting and charges capacitor 13C7 while precluding any conduction through tubes TU5 and TU11 due to the blocking of the relevant screen-grids. Meanwhile, the internal resistance of tube TU18 is still decreasing. Regarding the tube TU5, the blocking thereof causes the second "hot" period to end because the welding relay 5ReS is not energized, while the blocking of tube TU11 enables the capacitor 11C7 to be discharged.

Tube TU12 becoming conductive, it charges again the capacitor 12C7, thereby reblocking the tubes TU13 and TU8.

The non-conductive state of tube TU13 permits the capacitor 13C7 to be discharged through resistor 13R7 and vacuum tube TU18. This marks the beginning of the second "cool time" of the cycle, the duration of this period being determined by the internal resistance of tube TU18. Since the grid potential of this tube has passed from K to K¹, the internal resistance will be $R_2 < R_1$. Therefore, the second "cool time" will be shorter than the first one.

As already explained, the second "cool time" terminates exactly when the capacitor 13C7 is brought to zero potential. Then, tube TU5 becomes conducting and will energize again the welding relay 5ReS.

The cycle of the conductive and non-conductive impulses of the welding current is continued as described until the last "heat time" has been completed. As already indicated, this cycle commences with the blocking of tube TU12 and the discharge of capacitor 12C7, so as to bring the tube TU8 to its conducting state. Thus, the screen-grid of this tube is released when the capacitor 12C7 is discharged (at the end of the "hot" period) and its control grid is released when the capacitor 7C7 is brought to zero potential (end of the welding interval). Then, both tubes TU14 and TU9 are non-conductive.

The non-conductive state of tube TU14 enables the capacitor 14C7 to be discharged. When the zero potential has been attained by this capacitor, the tube TU15 charges the capacitor 15C7 and causes the tube TU12 to become non-conductive due to the blocking of its screen-grid. Consequently, the welding relay 5ReS cannot be re-energized subsequent to the termination of the last hot period.

The non-conductive state in tube TU9 which, as already pointed out hereinabove, is due to the conduction brought about in tube TU8, causes the capacitor 9C7 to be discharged through resistor 9R7 and potentiometer 9P7.

When capacitor 9C7 is discharged, tube TU10 becomes conductive and charges the capacitor 10C7 and blocks the control grid of tube TU1. This is the beginning of the repetition time separating two successive welding cycles.

The electronic apparatus for controlling a welding cycle which is described hereinabove constitutes but an exemplary form of embodiment of the invention, as the latter is not limited to the arrangement shown and described herein. Thus, the apparatus may be used for controlling machines or mechanisms of any description, which operate in accordance with a complex cycle within which operations of unequal durations must be performed.

Modifications and alterations may be brought to the apparatus described without departing from the spirit and scope of the invention, notably with a view to adapt this apparatus to a predetermined cycle of operations.

I claim:

1. The method of resistance spot welding metallic parts which comprises subjecting the parts to a selected welding pressure through the agency of electrodes during a selected period of time comprising a given welding cycle applying a periodically interrupted flow of welding current in a predetermined time pattern during a selected period of time, the welding current comprising predeterminably spaced impulses and the interruption periods varying in time in a selected sequence determined as a function of the welding characteristics of the parts being welded.

2. The method of resistance spot welding metallic parts which comprises subjecting the parts to a selected welding pressure through the agency of electrodes during a selected over-all period of time comprising a given welding cycle, applying a periodically interrupted flow of welding current in a predetermined time pattern during a selected period of time, the welding current comprising predeterminably spaced impulses and the interruption periods progressively decreasing in duration of time in a selected sequence during the welding cycle.

3. The method of resistance spot welding metallic parts which comprises subjecting the parts to a selected welding pressure through the agency of electrodes during a selected over-all period of time comprising a given welding cycle, applying a periodically interrupted flow of welding current in a predetermined time pattern during a selected period of time, the current intensity being unvaried during each over-all period of welding current flow, said welding current comprising predeterminably spaced impulses and the interruption periods progressively decreasing in duration of time in a selected sequence during each over-all period of welding current flow.

4. The method of resistance spot welding metallic parts which comprises subjecting the parts to a selected welding pressure through the agency of electrodes during a selected period of time comprising a given welding cycle applying a periodically interrupted flow of welding current having a given unvaried intensity in a predetermined time pattern having a given duration of time, the welding current comprising predeterminably spaced impulses and the interruption periods varying in time in a selected sequence, said sequence comprising at least one initial long period of time and sequential shorter periods of time.

5. The method of resistance spot welding metallic parts which comprises subjecting the parts to a selected welding pressure through the agency of welding electrodes during a selected overall period of time comprising a given welding cycle, applying a periodically interrupted flow of welding current in a predetermined time pattern having a given duration of time, the welding current comprising predeterminably spaced impulses of equal duration and the interruption periods progressively decreasing in duration of time in a selected sequence during the overall period of current flow.

6. The method of resistance spot welding metallic parts which comprises subjecting the parts to a selected welding pressure through the agency of welding electrodes during a selected over-all period of time comprising a given welding cycle, applying a periodically interrupted flow of welding current having a given unvaried intensity in a predetermined time pattern having a selected over-all duration of time, the welding current comprising predeterminably spaced impulses of equal duration and the interruption periods varying in time in a selected sequence during the over-all period of welding current flow, said sequence comprising at least one long period of time so as to permit preheating a joint between said parts and sequential shorter periods of time to permit welding said metallic parts.

7. The method of resistance spot welding metallic parts which comprises subjecting the parts to a selected welding pressure through the agency of welding electrodes during a selected over-all period of time comprising a given welding cycle, applying a periodically interrupted flow of welding current having a given unvaried intensity in a predetermined time pattern having a selected over-all duration of time, the welding current comprising predeterminably spaced impulses of equal duration and the interruption periods varying in time in a selected sequence shorter periods progressively decreasing in time to permit welding said metallic parts.

8. The method of resistance spot welding metallic parts which comprises subjecting the parts to a selected welding pressure through the agency of welding electrodes during a selected over-all period of time corresponding to a given welding cycle, applying a periodically interrupted flow of welding current having a given unvaried intensity and in a predetermined time pattern having a selected over-all period of time which is less than the over-all period during which welding pressure is applied, the welding current comprising predeterminably spaced impulses of equal duration and the interruption periods progressively decreasing in time at least through a portion of the over-all period of welding current flow.

9. The method of resistance spot welding metallic parts which comprises subjecting the parts to a selected welding pressure through the agency of welding electrodes during a selected over-all period of time corresponding to a given welding cycle, applying a periodically interrupted flow of welding current having a given unvaried intensity and in a predetermined time pattern having a selected over-all period of time which is less than the over-all period during which is applied, the welding current comprising predeterminably spaced impulses and the interruption periods progressively decreasing in time at least through a portion of the over-all period of welding current flow.

References Cited in the file of this patent
UNITED STATES PATENTS

| | | |
|---|---|---|
| 2,046,969 | Redmond | July 7, 1936 |
| 2,401,780 | Undy | June 11, 1946 |
| 2,577,163 | Spittler et al. | Dec. 4, 1951 |
| 2,607,893 | Cooper et al. | Aug. 19, 1952 |
| 2,619,591 | Parsons | Nov. 25, 1952 |